(12) United States Patent
Urano

(10) Patent No.: US 8,981,597 B2
(45) Date of Patent: Mar. 17, 2015

(54) WIRELESS POWER FEEDER, WIRELESS POWER RECEIVER, AND WIRELESS POWER TRANSMISSION SYSTEM

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 776 days.

(21) Appl. No.: 13/087,827

(22) Filed: Apr. 15, 2011

(65) Prior Publication Data

US 2011/0193421 A1    Aug. 11, 2011

(51) Int. Cl.
*H01F 38/14*    (2006.01)
*H02J 17/00*    (2006.01)

(52) U.S. Cl.
CPC ........................ *H02J 17/00* (2013.01)
USPC .......................................................... 307/104

(58) Field of Classification Search
CPC ......... H02J 17/00; H02J 5/005; H04B 5/0037
See application file for complete search history.

(56) References Cited

U.S. PATENT DOCUMENTS

| | | | | |
|---|---|---|---|---|
| 3,500,274 A * | 3/1970 | Muraki et al. | ................. | 336/65 |
| 7,741,734 B2 | 6/2010 | Joannopoulos et al. | | |
| 2007/0222542 A1 | 9/2007 | Joannopoulos et al. | | |
| 2008/0211320 A1 | 9/2008 | Cook et al. | | |
| 2008/0278264 A1 | 11/2008 | Karalis et al. | | |
| 2008/0298100 A1 * | 12/2008 | Esaka et al. | ..................... | 363/67 |
| 2009/0015075 A1 | 1/2009 | Cook et al. | | |
| 2009/0045772 A1 | 2/2009 | Cook et al. | | |
| 2009/0051224 A1 | 2/2009 | Cook et al. | | |
| 2009/0058189 A1 | 3/2009 | Cook et al. | | |
| 2009/0072627 A1 | 3/2009 | Cook et al. | | |
| 2009/0072628 A1 | 3/2009 | Cook et al. | | |
| 2009/0072629 A1 | 3/2009 | Cook et al. | | |
| 2009/0079268 A1 | 3/2009 | Cook et al. | | |
| 2009/0102292 A1 | 4/2009 | Cook et al. | | |
| 2009/0134712 A1 | 5/2009 | Cook et al. | | |
| 2009/0167449 A1 | 7/2009 | Cook et al. | | |
| 2009/0179502 A1 | 7/2009 | Cook et al. | | |
| 2009/0195332 A1 | 8/2009 | Joannopoulos et al. | | |
| 2009/0195333 A1 | 8/2009 | Joannopoulos et al. | | |
| 2009/0212636 A1 | 8/2009 | Cook et al. | | |
| 2009/0213028 A1 | 8/2009 | Cook et al. | | |
| 2009/0224608 A1 | 9/2009 | Cook et al. | | |
| 2009/0224609 A1 | 9/2009 | Cook et al. | | |
| 2009/0224856 A1 | 9/2009 | Karalis et al. | | |
| 2009/0243397 A1 * | 10/2009 | Cook et al. | ..................... | 307/104 |
| 2009/0267709 A1 | 10/2009 | Joannopoulos et al. | | |

(Continued)

FOREIGN PATENT DOCUMENTS

| | | |
|---|---|---|
| JP | 2006-230032 | 8/2006 |
| JP | 2009-106136 | 5/2009 |

(Continued)

*Primary Examiner* — Jared Fureman
*Assistant Examiner* — Joel Barnett
(74) *Attorney, Agent, or Firm* — McDermott Will & Emery LLP

(57) ABSTRACT

Power is fed from a feeding coil L2 to a receiving coil L3 using magnetic resonance. The receiving coil L3 is connected in series to a capacitor C3 to constitute a receiving coil circuit 130. The receiving coil L3 is further connected to an adjustment coil L5. By adjusting the inductance of the adjustment coil L5, the resonance frequency of the receiving coil circuit 130 can be adjusted. Since the axial direction of the adjustment coil L5 is at right angles to the power feeding direction, an electromotive force does not occur in the adjustment coil L5.

13 Claims, 18 Drawing Sheets

(56) References Cited

U.S. PATENT DOCUMENTS

| | | |
|---|---|---|
| 2009/0267710 A1 | 10/2009 | Joannopoulos et al. |
| 2009/0273242 A1 | 11/2009 | Cook et al. |
| 2009/0284083 A1 | 11/2009 | Karalis et al. |
| 2010/0038970 A1 | 2/2010 | Cook et al. |
| 2010/0052431 A1* | 3/2010 | Mita .............................. 307/104 |
| 2010/0052811 A1* | 3/2010 | Smith et al. ...................... 333/33 |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |

FOREIGN PATENT DOCUMENTS

| | | |
|---|---|---|
| WO | WO 2006/022365 A1 | 3/2006 |
| WO | 2009/111597 A2 | 9/2009 |

* cited by examiner

| TYPE | INPUT VOLTAGE [V] | INPUT CURRENT [A] | INPUT POWER [W] | OUTPUT POWER [W] | EFFICIENCY [%] |
|---|---|---|---|---|---|
| A1 | 84.5 | 0.29 | 24.5 | 20 | 81.6 |
| A2 | 84.5 | 0.29 | 24.5 | 20 | 81.6 |
| A3 | 84.5 | 0.29 | 24.5 | 20 | 81.6 |
| B1 | 81.1 | 0.32 | 26.0 | 20 | 77.1 |
| B2 | 78.5 | 0.39 | 30.6 | 20 | 65.3 |
| B3 | 88.6 | 0.36 | 31.9 | 20 | 62.7 |
| B4 | 75.3 | 0.37 | 27.9 | 20 | 71.8 |

FIG.14

WIRELESS POWER FEEDER, WIRELESS POWER RECEIVER, AND WIRELESS POWER TRANSMISSION SYSTEM

BACKGROUND OF THE INVENTION

1. Field of the Invention

The present invention relates to wireless power feeding/receiving of AC power.

2. Description of Related Art

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

The type (A) utilizing electromagnetic induction has generally been employed in familiar home appliances such as an electric shaver; however, it can be effective only in a short range of several centimeters. The type (B) utilizing radio wave is available in a long range; however, it cannot feed big electric power. The type (C) utilizing resonance phenomenon is a comparatively new technique and is of. particular interest because of its high power transmission efficiency even in an intermediate range of about several meters. For example, a plan is being studied in which a receiving coil is buried in a lower portion of an EV (Electric Vehicle) so as to feed power from a feeding coil in the ground in a non-contact manner. The wireless configuration allows a completely insulated system to be achieved, which is especially effective for power feeding in the rain. Hereinafter, the type (C) is referred to as "magnetic field resonance type".

The magnetic field resonance type is based on a theory published by Massachusetts Institute of Technology in 2006 (refer to Patent Document 1). In Patent Document 1, four coils are prepared. The four coils are referred to as "exciting coil", "feeding coil", "receiving coil", and "loading coil" in the order starting from the feeding side. The exciting coil and feeding coil closely face each other for electromagnetic coupling. Similarly, the receiving coil and loading coil closely face each other for electromagnetic coupling. The distance (intermediate distance) between the feeding coil and receiving coil is larger than the distance between the exciting coil and feeding coil and distance between the receiving coil and loading coil. This system aims to feed power from the feeding coil to receiving coil.

When AC power is fed to the exciting coil, current also flows in the feeding coil according to the principle of electromagnetic induction. When the feeding coil generates a magnetic field to cause the feeding coil and receiving coil to magnetically resonate, large current flows in the receiving coil. At this time, current also flows in the loading coil according to the principle of electromagnetic induction, and power is taken out from a load connected in series to the loading coil. By utilizing the magnetic field resonance phenomenon, high power transmission efficiency can be achieved even if the feeding coil and receiving coil are largely spaced from each other.

CITATION LIST

Patent Document

[Patent Document 1] U.S. Pat. Appln. Publication No. 2008-0278264

[Patent Document 2] Jpn. Pat. Appln. Laid-Open Publication No. 2006-230032

[Patent Document 3] International Publication No. WO2006-022365

[Patent Document 4] U.S. Pat. Appln. Publication No. 2009-0072629

[Patent Document 5] U.S. Pat. Appln. Publication No. 2009-0015075

[Patent Document 6] Jpn. Pat. Appln. Laid-Open Publication No. 2009-106136

A receiving coil is connected to a capacitor to constitute an LC resonance circuit. A feeding coil is also connected to another capacitor to constitute an LC resonance circuit. When the resonance frequencies of these LC resonance circuits coincide with each other, power transmission efficiency becomes maximum. The resonance frequency of the LC resonance circuit can be adjusted by the inductance of a coil and electrostatic capacitance of the capacitor.

In a system disclosed in Patent Document 5, the induction of a coil is fixed, while the electrostatic capacitance is adjusted by two variable capacitors (refer to FIG. 9 and paragraph [0063]). The resonance frequency of this system is set at a high-frequency band (13.9 MHz) (refer to FIG. 10A and paragraph [0064]).

However, in order to set the resonance frequency at a low-frequency band in the system of Patent Document 5, it is necessary to provide a variable capacitor with large capacitance and to increase the area of an electrode plate of the capacitor. This results in an increase in the physical size of the entire system. Since a frequency band not higher than 135 kHz is less constrained by Radio Act, it is preferable to set the resonance frequency at a low frequency band.

The present invention has been achieved based on the above-described issue, and an object thereof is to facilitate adjustment of the resonance frequency in wireless power feeding of a magnetic field resonance type.

SUMMARY

A wireless power feeder according to the present invention is a device that feeds power from a feeding coil to a receiving coil by wireless using a magnetic field resonance phenomenon between the feeding coil and receiving coil. The wireless power feeder includes a power supply circuit and a feeding coil circuit. The power supply circuit supplies AC power to the feeding coil. The feeding coil circuit further includes an adjustment coil whose axial direction is at substantially right angles (orthogonal) to the direction of magnetic flux generated by the receiving coil.

The inductance of the feeding coil circuit is adjusted by the adjustment coil. When magnetic flux generated by the receiving coil penetrates the adjustment coil, an electromotive force occurs in the adjustment coil. However, when the axial direction of the adjustment coil and the direction of the magnetic flux are at right angles to each other, the electromotive force is difficult to occur in the adjustment coil. Thus, when the axial direction of the adjustment coil and the direction of the magnetic flux are made at right angles to each other, it is possible to easily adjust only the inductance of the feeding coil circuit while eliminating influence of an external magnetic field on the adjustment coil. The angle formed by the axial direction and direction of the magnetic flux is preferably at right angles, which means an angle of 90 degrees, but a certain margin of, e.g., the plus/minus 5° may be provided. At any rate, it is sufficient to reduce the electromotive force occurring in the adjustment coil to an allowable level.

The axial direction of the adjustment coil may be at substantially right angles to the power feeding direction of the feeding coil. The wireless power feeder may further have an exciting circuit including an exciting coil magnetically coupled to the feeding coil. The exciting circuit may supply the AC power supplied from the power supply circuit from the exciting coil to feeding coil. The adjustment coil may have a movable core that moves in its axial direction. The inductance of the feeding coil circuit may be adjusted by the displacement of the movable core.

The power supply circuit may cause the feeding coil to which no capacitor is connected in series or in parallel, to feed the AC power to the receiving coil. The resonance of the feeding coil may not be essential for the wireless power feeding, but this does not mean that even an accidental resonance of the feeding coil with some circuit elements is eliminated. A configuration may be possible in which the feeding coil does not form, together with circuit elements on the power feeding side, a resonance circuit having a resonance point corresponding to the resonance frequency of the receiving coil. Further, a configuration may be possible in which no capacitor is connected in series or in parallel to the feeding coil.

The feeding coil circuit may be constructed as a circuit that resonates at the resonance frequency of the receiving coil.

A wireless power receiver according to the present invention is a device that receives, at a receiving coil, AC power fed from a feeding coil by wireless using a magnetic field resonance phenomenon between the feeding coil and receiving coil. The wireless power receiver includes a receiving coil circuit and a loading circuit. The receiving coil circuit includes a receiving coil and a capacitor. The loading circuit includes a loading coil that is magnetically coupled to the receiving coil to receive the AC power from the receiving coil and a load to which the AC power is supplied from the loading coil. The receiving coil circuit further includes an adjustment coil whose axial direction is at substantially right angles (orthogonal) to the direction of magnetic flux generated by the feeding coil.

The inductance of the receiving coil circuit is adjusted by the adjustment coil. That is, the resonance frequency of the receiving coil can be adjusted by the adjustment coil. When magnetic flux generated by the feeding coil penetrates the adjustment coil, an electromotive force occurs in the adjustment coil. However, when the axial direction of the adjustment coil and the direction of the magnetic flux are at right angles to each other, the electromotive force is difficult to occur in the adjustment coil. Thus, when the axial direction of the adjustment coil and the direction of the magnetic flux are made at right angles to each other, it is possible to easily adjust the inductance of the receiving coil circuit.

The axial direction of the adjustment coil may be at substantially right angles to the power feeding direction of the feeding coil. The adjustment coil may have a movable core that moves in its axial direction. The inductance of the receiving coil circuit may be adjusted by the displacement of the movable core.

The receiving coil circuit may be constructed as a circuit that resonates at the resonance frequency of the feeding coil circuit.

A wireless power transmission system according to the present invention is a system for feeding power from a feeding coil to a receiving coil by wireless using a magnetic field resonance phenomenon between the feeding coil and receiving coil. The system includes a power supply circuit that supplies AC power to the feeding coil, a feeding coil circuit that includes the feeding coil, a receiving coil circuit that includes a receiving coil and a capacitor, and a loading circuit that includes a loading coil that is magnetically coupled to the receiving coil to receive the AC power from the receiving coil and a load to which the AC power is supplied from the loading coil. Both or one of the feeding coil circuit and receiving coil circuit have an adjustment coil whose axial direction is at substantially right angles to the power feeding direction of the feeding coil.

It is to be noted that any arbitrary combination of the above-described structural components and expressions changed between a method, an apparatus, a system, etc. are all effective as and encompassed by the present embodiments.

According to the present invention, it is possible to facilitate adjustment of the resonance frequency, especially in a low-frequency band, in wireless power feeding technique of a magnetic field resonance type.

BRIEF DESCRIPTION OF THE DRAWINGS

The above features and advantages of the present invention will be more apparent from the following description of certain preferred embodiments taken in conjunction with the accompanying drawings, in which:

FIG. 14 is a view illustrating a relationship between each of arrangement methods and power transmission efficiency;

DETAILED DESCRIPTION OF THE EMBODIMENTS

Preferred embodiments of the present invention will be described below with reference to the accompanying drawings.

[First Embodiment]

Figure 1:
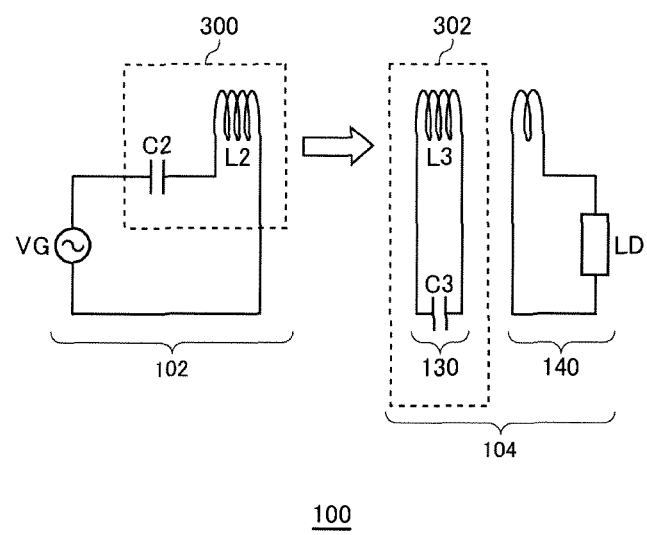
FIG. 1 is a view illustrating operation principle of a wireless power transmission system according to a first embodiment.

FIG. 1 is a view illustrating operation principle of a wireless power transmission system 100 according to the first embodiment. The wireless power transmission system 100 in the first embodiment includes a wireless power feeder 102 and a wireless power receiver 104. The wireless power feeder 102 includes a power feeding LC resonance circuit 300. The wireless power receiver 104 includes a receiving coil circuit 130 and a loading circuit 140. A power receiving LC resonance circuit 302 is formed by the receiving coil circuit 130.

The power feeding LC resonance circuit 300 includes a capacitor C2 and a feeding coil L2. The power receiving LC resonance circuit 302 includes a capacitor C3 and a receiving coil L3. The values of the capacitor C2, feeding coil L2, capacitor C3, and receiving coil L3 are set such that the resonance frequencies of the feeding LC resonance circuit 300 and receiving LC resonance circuit 302 coincide with each other in a state where the feeding coil L2 and receiving coil L3 are disposed away from each other far enough to ignore the magnetic field coupling therebetween. This common resonance frequency is assumed to be fr0.

In a state where the feeding coil L2 and receiving coil L3 are brought close to each other in such a degree that they can be magnetic-field-coupled to each other, a new resonance circuit is formed by the power feeding LC resonance circuit 300, power receiving LC resonance circuit 302, and mutual inductance generated between them. The new resonance circuit has two resonance frequencies fr1 and fr2 (fr1<fr0<fr2) due to the influence of the mutual inductance. When the wireless power feeder 102 supplies AC power from a power feeding source VG to the power feeding LC resonance circuit 300 at the resonance frequency fr1, the power feeding LC resonance circuit 300 constituting a part of the new resonance circuit resonates at a resonance point 1 (resonance frequency fr1). When the power feeding LC resonance circuit 300 resonates, the feeding coil L2 generates an AC magnetic field of the resonance frequency fr1. The power receiving LC resonance circuit 302 constituting a part of the new resonance circuit also resonates by receiving the AC magnetic field. When the power feeding LC resonance circuit 300 and power receiving LC resonance circuit 302 resonate at the same resonance frequency fr1, wireless power feeding from the feeding coil L2 to receiving coil L3 is performed with the maximum power transmission efficiency. Received power is taken from a load LD of the wireless power receiver 104 as output power. Note that the new resonance circuit can resonate not only at the resonance point 1 (resonance frequency fr1) but also at a resonance point 2 (resonance frequency fr2).

Although FIG. 1 illustrates a configuration in which the wireless power feeder 102 does not include an exciting coil L1 of an exciting circuit 110, the basic operation principle of the wireless power feeder 102 is the same as in the case where the wireless power feeder 102 includes the exciting coil L1. A configuration in which the wireless power feeder 102 does not include the exciting coil L1 will be described later using FIG. 15 and the like.

Figure 2:
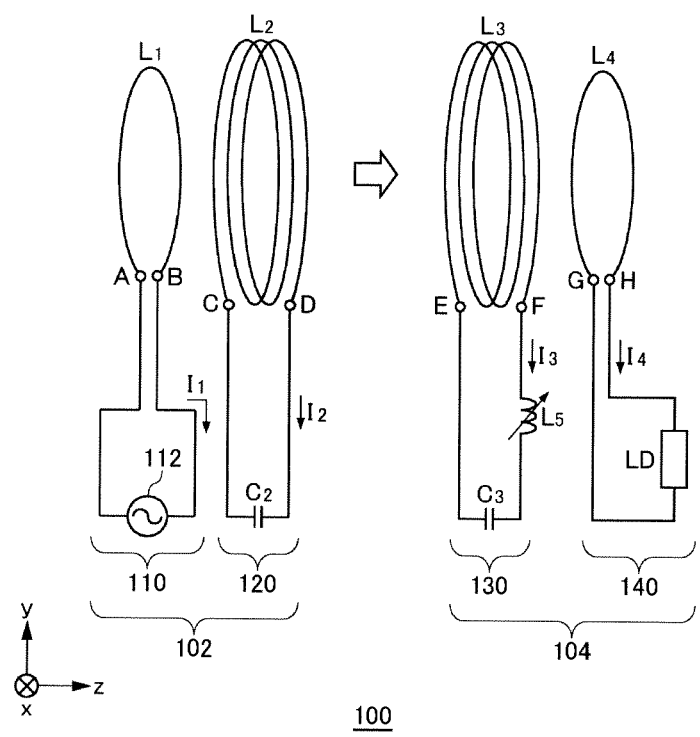
FIG. 2 is a system configuration view of the wireless power transmission system according to the first embodiment.

FIG. 2 is a system configuration view of the wireless power transmission system 100 in the first embodiment. The wireless power transmission system 100 includes a wireless power feeder 102 on the power feeding side and a wireless power receiver 104 on the power receiving side. The wireless power feeder 102 includes an exciting circuit 110 and a feeding coil circuit 120. The wireless power receiver 104 includes a receiving coil circuit 130 and a loading circuit 140.

A distance of about 0.2 m to 1.0 m is provided between the feeding coil L2 included in the feeding coil circuit 120 and receiving coil L3 included in the receiving coil circuit 130. The wireless power transmission system 100 mainly aims to feed power from the feeding coil L2 to the receiving coil L3 by wireless. The wireless power transmission system 100 according to the present embodiment is assumed to operate at a resonance frequency of 100 kHz or less. In the present embodiment, a resonance frequency fr1 is set to 44.5 kHz. Thus, the resonance frequency of the feeding coil circuit 120 and resonance frequency fr1 of the receiving coil circuit 130 are set to 44.5 kHz, respectively. Note that the wireless power transmission system according to the present embodiment can operate in a high-frequency band such as ISM (Industry-Science-Medical) frequency band.

Hereinafter, z-axis is set in the direction from the feeding coil L2 to receiving coil L3. Further, x-axis and y-axis crossing z-axis at right angles are set as illustrated in FIG. 2.

The exciting circuit 110 is a circuit in which an exciting coil L1 and an AC power supply 112 are connected in series. One end point of the exciting coil L1 is assumed to be A, and the other end point thereof is assumed to be B. The exciting coil L1 receives AC power of the resonance frequency fr1 (=44.5 kHz) from the AC power supply 112. The number of windings of the exciting coil L1 is 1, cross-sectional shape of a coil conductor thereof is a rectangle of 0.6 mm×6.0 mm, and shape of the exciting coil L1 itself is a square of 210 mm×210 mm. In FIG. 2, the exciting coil L1 is represented by a circle for descriptive purpose. Other coils are also represented by circles for the same reason. All the coils illustrated in FIG. 2 are made of copper.

The feeding coil circuit 120 is a circuit in which the feeding coil L2 and capacitor C2 are connected in series. One end point of the feeding coil L2 is assumed to be C, and the other end point thereof is assumed to be D. The feeding coil L2 is a coil whose number of windings is 15 and having an inductance of 128 (μH), and electrostatic capacitance of the capacitor C2 is 0.1 (μF). The exciting coil L1 and feeding coil L2 face each other. The distance between the exciting coil L1 and feeding coil L2 is as comparatively small as 10 mm or less. Thus, the exciting coil L1 and feeding coil L2 are electromagnetically strongly coupled to each other. The cross-sectional shape of a coil conductor of the feeding coil L2 is a rectangle of 0.6 mm×6.0 mm, and shape of the feeding coil L2 itself is a square of 280 mm×280 mm. When AC current I1 is made to flow in the exciting coil L1, an electromotive force occurs in the feeding coil L2 according to the principle of electromagnetic induction to cause AC current I2 to flow in the feeding coil circuit 120. The AC current I2 is considerably larger than the AC current I1. The values of the feeding coil L2 and capacitor C2 are set such that the resonance frequency fr1 is 44.5 kHz.

The receiving coil circuit 130 is a circuit in which the receiving coil L3, an adjustment coil L5, and capacitor C3 are connected in series. One end point of the receiving coil L3 is assumed to be E, and the other end point thereof is assumed to be F. The adjustment coil L5 is connected to the end point F side. The receiving coil L3 is a coil whose number of windings is 14 and having an inductance of 112 (μH), and electrostatic capacitance of the capacitor C2 is 0.1 (µF). The feeding coil L2 and receiving coil L3 face each other. The distance between the feeding coil L2 and receiving coil L3 is as comparatively large as about 0.2 m to 1 m. The cross-sectional shape of a coil conductor of the receiving coil L3 is a rectangle of 0.6 mm×6.0 mm, and shape of the receiving coil L3 itself is a square of 280 mm×280 mm. The values of the receiving coil L3 and capacitor C3 are set such that the resonance frequency fr1 is 44.5 kHz. The resonance frequency fr1 can be finely adjusted by the adjustment coil L5. The details of the adjustment coil L5 will be described later using FIG. 5. When the feeding coil L2 generates a magnetic field at the resonance frequency fr1 (=44.5 kHz), the feeding coil circuit 120 and receiving coil circuit 130 magnetically resonate, causing large current I3 to flow in the receiving coil circuit 130.

The loading circuit 140 is a circuit in which a loading coil L4 and the load LD are connected in series. One endpoint of the loading coil L4 is assumed to be G, and the other end point thereof is assumed to be H. The receiving coil L3 and loading coil L4 are brought close to each other to such an extent that they substantially overlap each other. Thus, the receiving coil L3 and loading coil L4 are electromagnetically strongly coupled to each other. The number of windings of the loading coil L4 is 1, cross-sectional shape of a coil conductor thereof is a rectangle of 0.6 mm×6.0 mm, and shape of the loading coil L4 itself is a square of 300 mm×300 mm. When the current I3 is made to flow in the receiving coil L3, an electromotive force occurs in the loading coil L4 to cause current I4 to flow in the loading circuit 140. Thus, the AC power supplied from the AC power supply 112 is fed by the exciting circuit 110 and feeding coil circuit 120 to the receiving coil circuit 130 and loading circuit 140. After that, the AC power is taken from the load LD.

When the load LD is connected in series to the receiving coil circuit 130, the Q-value of the receiving coil circuit 130 is degraded. Therefore, the receiving coil circuit 130 for power reception and loading circuit 140 for power extraction are separated from each other. In order to enhance power transmission efficiency, the center lines of the exciting coil L1, feeding coil L2, receiving coil 13, and loading coil L4 are preferably made to coincide with one another.

In general, a variation of about ±5% occurs in the electrostatic capacitance of the capacitor due to the condition in production. Thus, even if a capacitor C3 having a value that sets the resonance frequency fr1 to 44.5 kHz is selected, the actual resonance frequency fr1 deviates from 44.5 kHz sometimes. When the electrostatic capacitance of the capacitor C3 is variable, ex-post adjustment of the resonance frequency fr1 can be made. However, when the resonance frequency fr1 has been set at a low-frequency band, a large-capacity capacitor C3 is required. In this case, the size of the capacitor C3 tends to increase. At present, a small-sized, large-capacity, and variable capacitor is impractical.

In order to reduce the resonance frequency fr1, the inductance of the receiving coil circuit 130 may be increased. However, parameters of the receiving coil L3 influences the resonance characteristics, it is not preferable for the receiving coil L3 itself to be subjected to adjustment. Thus, in the wireless power transmission system 100 of the present embodiment, the adjustment coil L5 is connected in series to the receiving coil L3 so as to adjust the inductance of the adjustment coil L5 for adjustment of the resonance frequency of the receiving coil circuit 130.

Figure 3:
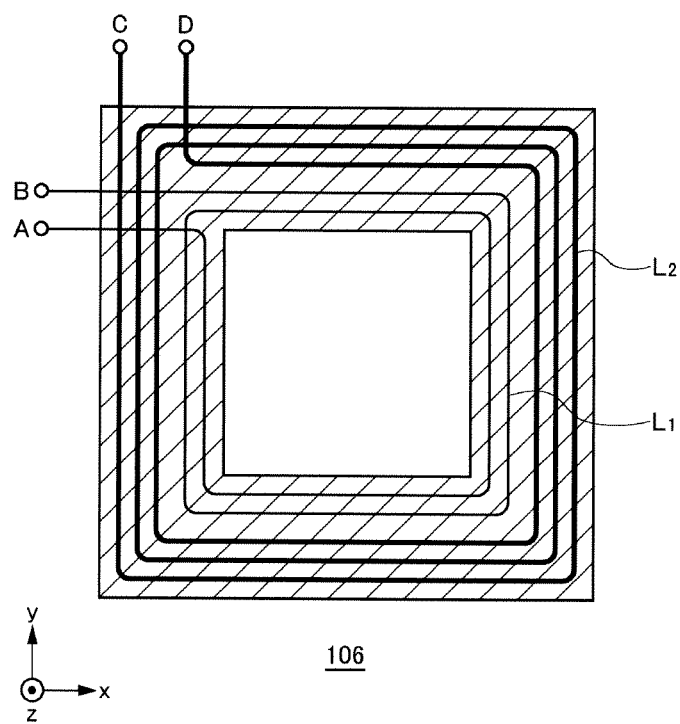
FIG. 3 is a view schematically illustrating a winding state of an exciting coil and a feeding coil.

FIG. 3 is a view schematically illustrating a winding state of the exciting coil L1 and feeding coil L2. The exciting coil L1 is an air core coil and has substantially a rectangular conductor cross-section. The feeding coil L2 is a coil wound outside the exciting coil L1 and has substantially a rectangular conductor cross-section. The entire body or a part of the wireless power feeder 102 is packaged as a transmission package 106. With the configuration of the transmission package 106, the most part of the wireless power feeder 102 is put in one package. In the present embodiment, the exciting coil L1 and feeding coil L2 overlap each other with a distance between them being zero, so that they are strongly magnetically coupled to each other. Further, the exciting coil L1 and feeding coil L2 each have a coil conductor cross-sectional shape of substantially a rectangle, so that even when the coils are wound in multiple turns, the size (area of the square surface) of the transmission package 106 is unlikely to increase. With this configuration, the transmission package 106 including the main part of the wireless power feeder 102 can be formed compact.

Figure 4:
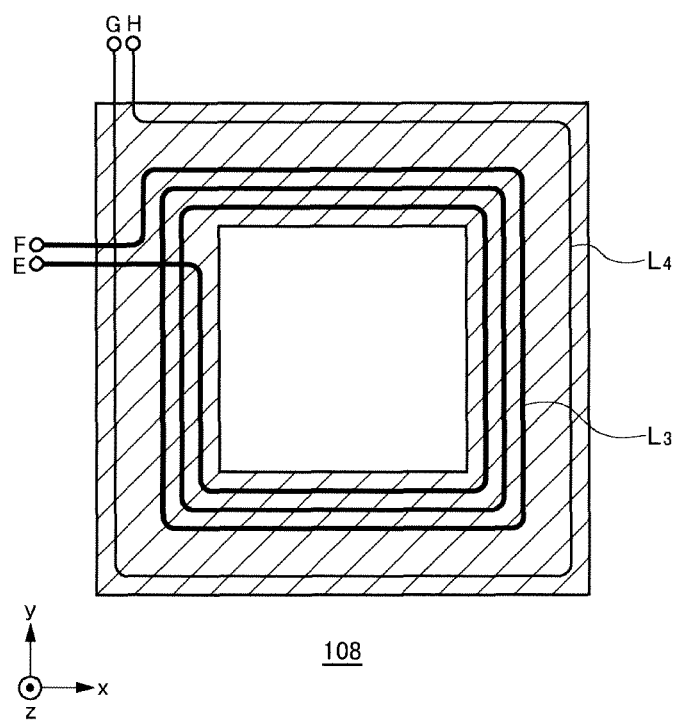
FIG. 4 is a view schematically illustrating a winding state of a receiving coil and a loading coil.

FIG. 4 is a view schematically illustrating a winding state of the receiving coil L3 and loading coil L4. The receiving coil L3 is an air core coil and has substantially a rectangular conductor cross-section. The loading coil L4 is a coil wound outside the receiving coil L3 and has substantially a rectangular conductor cross-section. The entire body or a part of the wireless power receiver 104 is packaged as a transmission package 108. With the configuration of the receiving package 108, the most part of the wireless power receiver 104 is put in one package. In the present embodiment, the receiving coil L3 and loading coil L4 overlap each other with a distance between them being zero, so that they are strongly magnetically coupled to each other. With this configuration, the receiving package 108 including the main part of the wireless power receiver 104 can be formed compact.

Figure 5:
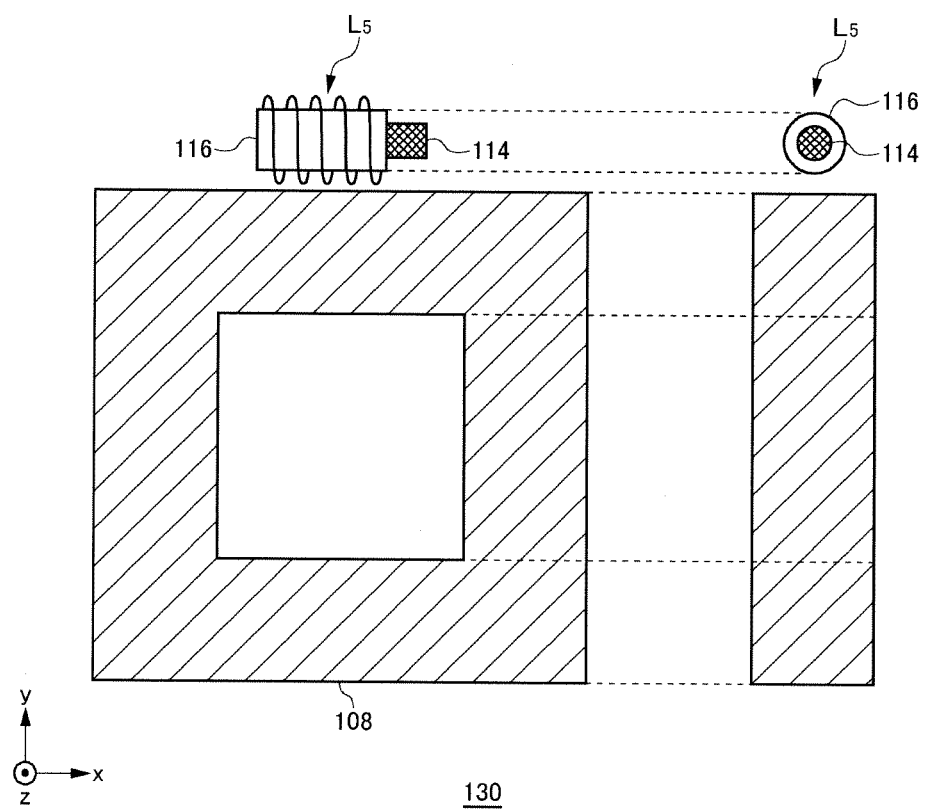
FIG. 5 is a first example of a view schematically illustrating a positional relationship between a receiving package and an adjustment coil.

FIG. 5 is a first example of a view schematically illustrating a positional relationship between the receiving package 108 and adjustment coil L5. The adjustment coil L5 is wound around a bobbin 116, and a movable core 114 is inserted into the bobbin 116. As described above, the adjustment coil L5 is connected in series to the receiving coil L3. The detailed structures of the adjustment coil L5, bobbin 116, and movable core 114 will be described later using FIGS. 7 and 8. As illustrated in FIG. 5, the adjustment coil L5 is arranged outside the receiving package 108, and the axial direction thereof coincides with x-axis direction described above. Since the axial directions of the exciting coil L1, feeding coil L2, receiving coil L3, and loading coil L4 coincide with z-axis direction, the axial directions of these coils and axial direction of the adjustment coil L5 are at right angles (orthogonal) to each other. The arrangement method of the adjustment coil L5 illustrated in FIG. 5 is referred to as "type A1".

Figure 6:
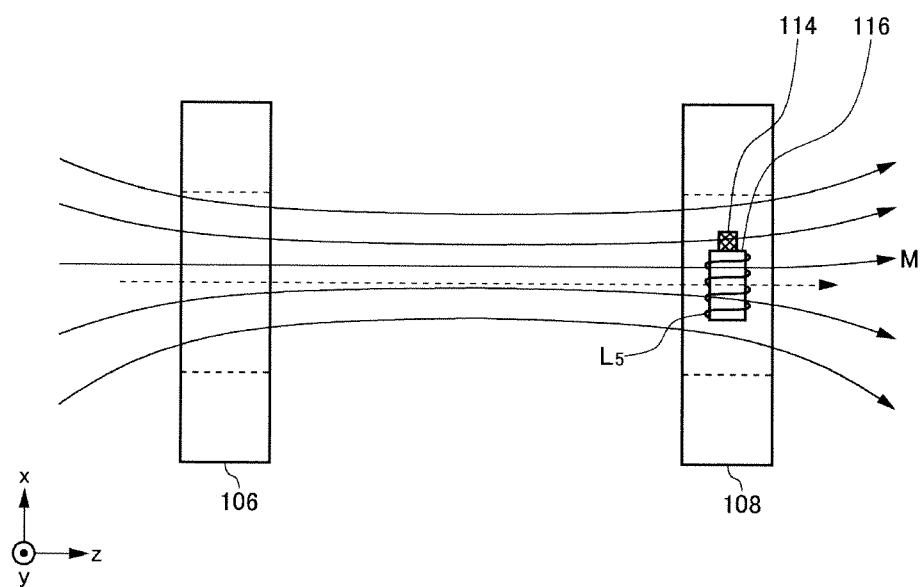
FIG. 6 is a view schematically illustrating a relationship between magnetic flux generated by the feeding coil and adjustment coil in type A1.

FIG. 6 is a view schematically illustrating a relationship between the magnetic flux generated by the feeding coil L2 and adjustment coil L5 in type A1. The feeding coil L2 is wound on the xy plane of the transmission package 106 with its axial direction coinciding with z-axis direction. Therefore, magnetic flux M of the feeding coil L2 is generated in z-axis direction so as to perpendicularly penetrate the xy plane of the receiving package 108. The receiving coil L3 is wound on the xy plane of the receiving package 108 with its axial direction coinciding with z-axis direction. Thus, an electromotive force occurs in the receiving coil L3 to cause the AC current I3. When the feeding coil L2 and receiving coil L3 resonate at the same resonance frequency fr1, power transmission efficiency from the feeding coil L2 to the receiving coil L3 becomes maximum.

The direction (z-axis direction) of the magnetic flux M and axial direction (x-axis direction) of the adjustment coil L5 are at right angles to each other. Thus, an electromotive force does not occur in the adjustment coil L5. That is, the adjustment coil L5 does not become a factor for increasing/decreasing the AC current I3. The adjustment coil L5 only contributes to an increase/decrease in the inductance of the receiving coil circuit 130.

Figure 7:
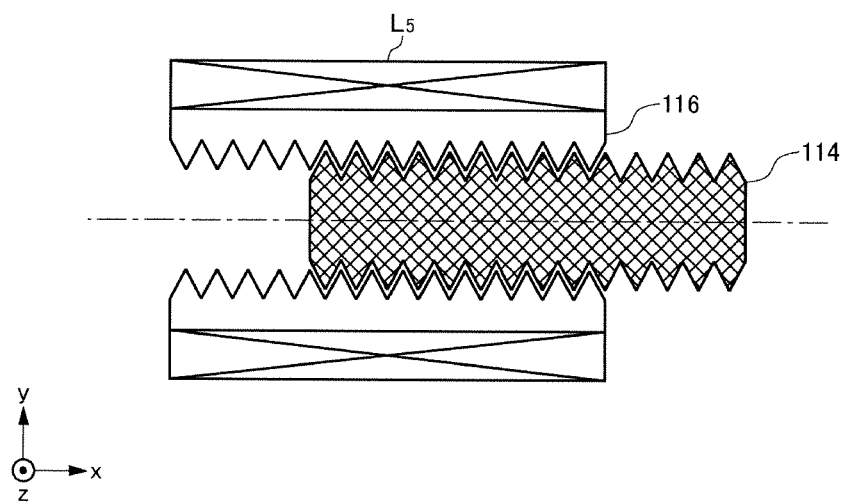
FIG. 7 is an example of a cross-sectional view of the adjustment coil.

FIG. 7 is an example of a cross-sectional view of the adjustment coil L5. The adjustment coil L5 is wound around the bobbin 116. A screw groove is formed in the inner wall surface of the bobbin 116, and the movable core 114 having an outer wall surface in which a screw groove is formed is inserted into the bobbin 116. The bobbin 116 is made of resin, and the movable core 114 is made of a magnetic body such as ferrite. When the movable core 114 is made to rotate, it moves in its axial direction (x-axis direction). The deeper the movable core 114 is inserted into the bobbin 116, the larger the inductance of the adjustment coil L5 becomes. That is, the resonance frequency of the receiving coil circuit 130 can be adjusted by the displacement of the movable core 114.

Figure 8:
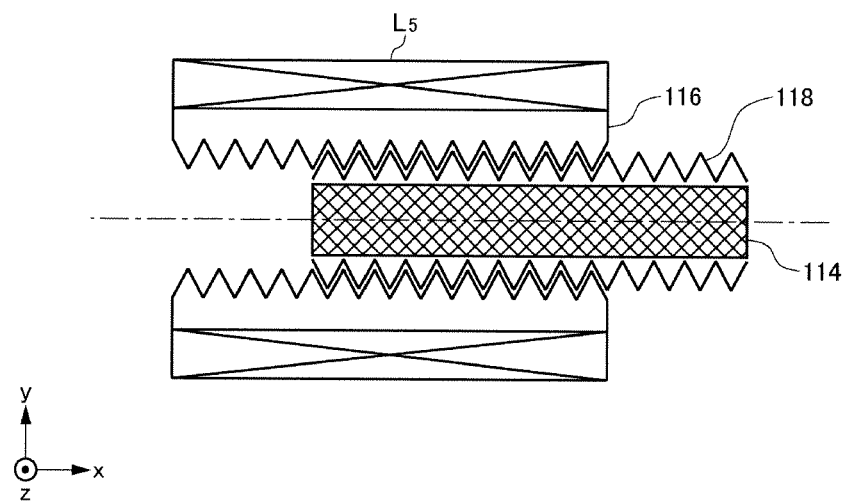
FIG. 8 is another example of a cross-sectional view of the adjustment coil.

FIG. 8 is another example of a cross-sectional view of the adjustment coil L5. Unlike the configuration illustrated in FIG. 7, a column-shaped movable core 114 is inserted into a cylindrical core case 118 having an outer wall surface in which a screw groove is formed. The core case 118 is made of resin. The core case 118 and movable core 114 are integrated with each other by adhesive or the like. When the core case 118 containing the movable core 114 is made to rotate, the movable core 114 moves in the axial direction (x-axis direction). Also in such a configuration, the resonance frequency of the receiving coil circuit 130 can be adjusted by the displacement of the movable core 114.

Figure 9:
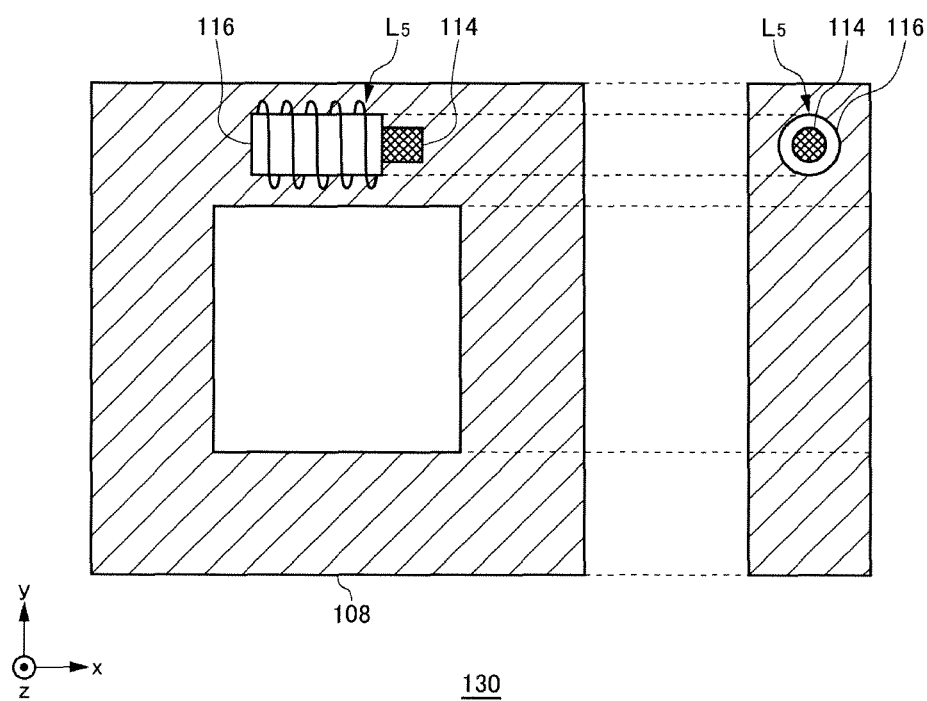
FIG. 9 is a second example of a view schematically illustrating a positional relationship between the receiving package and adjustment coil.

FIG. 9 is a second example of a view schematically illustrating a positional relationship between the receiving package 108 and adjustment coil L5. The adjustment coil L5 is arranged so as to overlap the receiving package 108 such that the axial direction thereof coincides with x-axis direction. Since the axial directions of the exciting coil L1, feeding coil L2, receiving coil L3, and loading coil L4 coincide with z-axis direction, the axial directions of these coils and axial direction of the adjustment coil L5 are at right angles to each other. The arrangement method of the adjustment coil L5 illustrated in FIG. 9 is referred to as "type A2". Also in the case of type A2, the magnetic flux M of the feeding coil L2 does not cause an electromotive force to occur in the adjustment coil L5.

Figure 10:
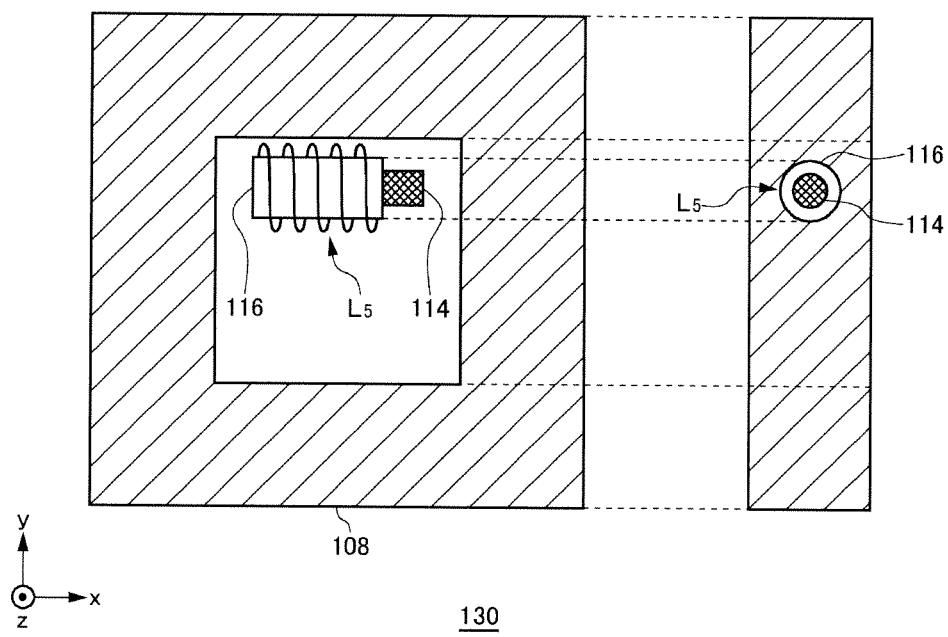
FIG. 10 is a third example of a view schematically illustrating a positional relationship between the receiving package and adjustment coil.

FIG. 10 is a third example of a view schematically illustrating a positional relationship between the receiving package 108 and adjustment coil L5. The adjustment coil L5 is arranged in the air core of the receiving package 108 such that the axial direction thereof coincides with x-axis direction. Also in this case, the axial directions of the exciting coil L1 and the like and axial direction of the adjustment coil L5 are at right angles to each other. The arrangement method of the adjustment coil L5 illustrated in FIG. 10 is referred to as "type A3". Also in the case of type A3, the magnetic flux M of the feeding coil L2 does not cause an electromotive force to occur in the adjustment coil L5.

Figure 11:
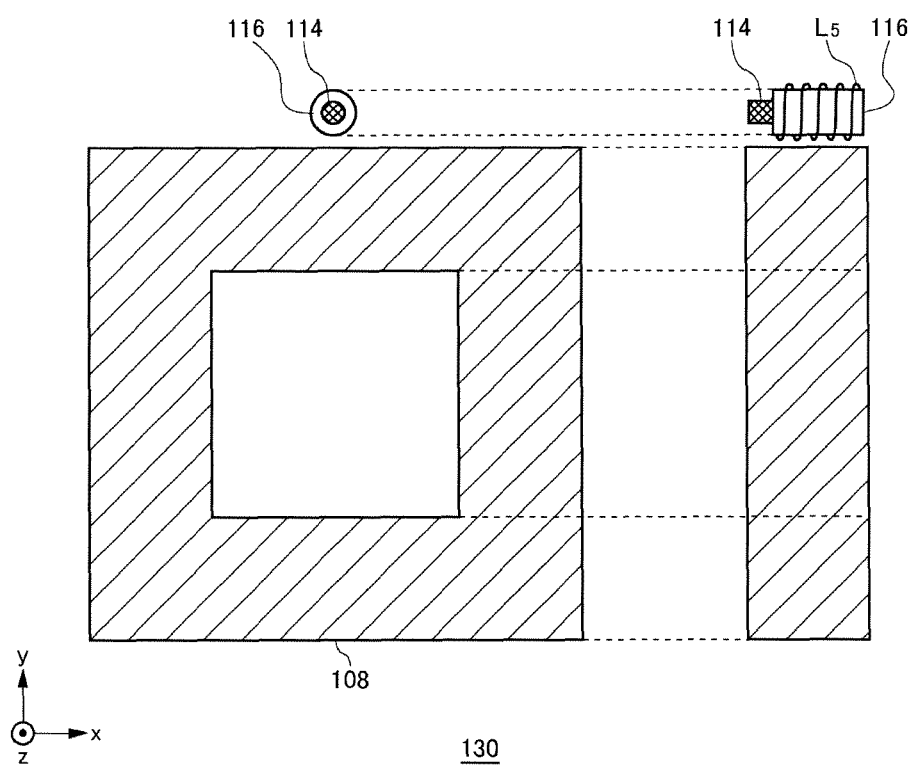
FIG. 11 is a fourth example of a view schematically illustrating a positional relationship between the receiving package and adjustment coil.

FIG. 11 is a fourth example of a view schematically illustrating a positional relationship between the receiving package 108 and adjustment coil L5. As in the case of FIG. 5, the adjustment coil L5 is arranged outside the receiving package 108. In this case, however, the axial direction of the adjustment coil L5 coincides, not with the x-axis direction, but with z-axis direction. Since the axial directions of the exciting coil L1, feeding coil L2, receiving coil L3, and loading coil L4 coincide with z-axis direction, the axial directions of these coils and axial direction of the adjustment coil L5 are parallel to each other. In an arrangement method illustrated in FIG. 11, a pattern in which the winding direction of the adjustment coil L5 and winding direction of the receiving coil L3 are the same as each other is referred to as "type B1", and a pattern in which the winding direction of the adjustment coil L5 and winding direction of the receiving coil L3 are opposite to each other is referred to as "type B2".

Figure 12:
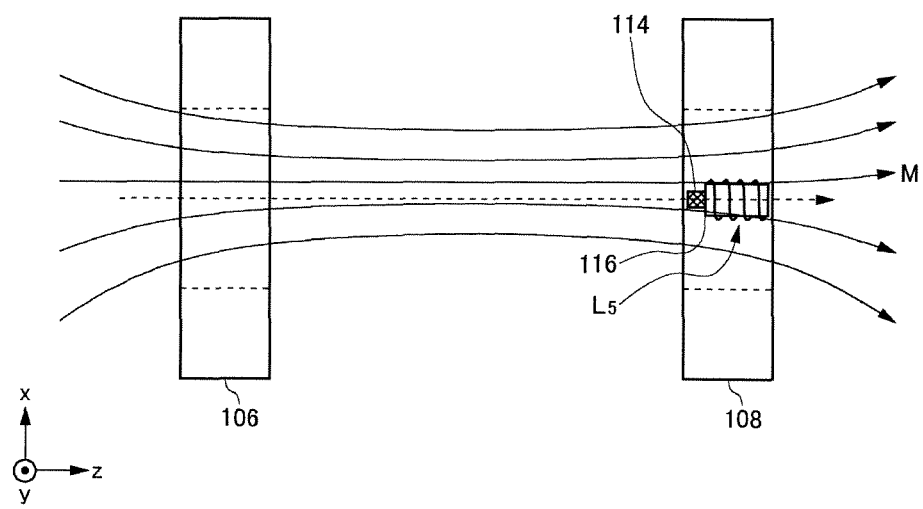
FIG. 12 is a view schematically illustrating a relationship between the magnetic flux generated by the feeding coil and adjustment coil in type B1.

FIG. 12 is a view schematically illustrating a relationship between the magnetic flux generated by the feeding coil L2 and adjustment coil L5 in type B1. The magnetic flux M of the feeding coil L2 is generated in z-axis direction so as to perpendicularly penetrate not only the receiving coil L3 but also the adjustment coil L5. Thus, an electromotive force occurs not only in the receiving coil L3, but also in the adjustment coil L5. That is, in type B1, not only the inductance of the receiving coil circuit 130, but also the AC current I3 flowing in the receiving coil circuit 130 changes. This makes it difficult to make the resonance frequency of the receiving coil L3 and resonance frequency of the feeding coil L2 coincide with each other.

Figure 13:
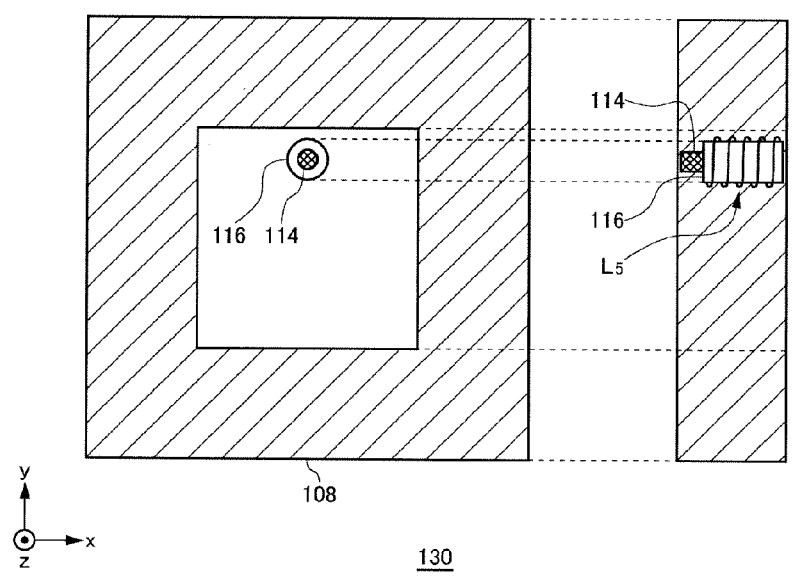
FIG. 13 is a fifth example of a view schematically illustrating a positional relationship between the receiving package and adjustment coil.

FIG. 13 is a fifth example of a view schematically illustrating a positional relationship between the receiving package 108 and adjustment coil L5. As in the case of FIG. 10, the adjustment coil L5 is arranged in the air core of the receiving package 108. In this case, however, the axial direction of the adjustment coil L5 coincides, not with the x-axis direction, but with z-axis direction. Therefore, the axial directions of the exciting coil L1 and the like and axial direction of the adjustment coil L5 coincide with each other. In an arrangement method illustrated in FIG. 13, a pattern in which the winding direction of the adjustment coil L5 and winding direction of the receiving coil L3 are the same as each other is referred to as "type B3", and a pattern in which the winding direction of the adjustment coil L5 and winding direction of the receiving coil L3 are opposite to each other is referred to as "type B4".

FIG. 14 is a view illustrating a relationship between each of the abovementioned arrangement methods and power transmission efficiency. In FIG. 14, input voltage (V) is the effective value of voltage generated by the AC power supply 112, input current (A) is the effective value of the AC current I1 flowing in the exciting circuit 110, and input power (W) is the effective value of feeding power calculated from the input voltage and input current. Output power (W) is the effective value of power taken from the load LD. Efficiency (%) can be calculated by output power (W)/input power (W).

In FIG. 14, the output value of the AC power supply 112 is adjusted such that the output power becomes 20 (W) for each of the arrangement methods of types A1 to A3 and types B1 to B4. It is assumed, in each case, that the same adjustment value is set for the adjustment coil L5. As is clear from FIG. 14, an efficiency as high as 81.6% is achieved in types A1 to A3, while the efficiency is less than 81% in types B1 to B4.

In the case of types B1 to B4, when the output of the AC power supply 112 is changed, the electromotive force of the adjustment coil L5 is also changed. Thus, when the output value of the AC power supply 112 needs to be changed, it is necessary to optimally adjust the adjustment coil L5. On the other hand, in types A1 to A3, even when the output of the AC power supply 112 is changed, an electromotive force does not occur in the adjustment coil L5. Thus, after the resonance frequency of the receiving coil circuit 130 is once adjusted, the adjustment coil L5 need not be readjusted even when the output value of the AC power supply 112 is changed. The reason for this is that the output value of the AC power supply 112 does not directly influence on the adjustment coil L5.

The inductance of the receiving coil circuit 130 may be adjusted by the adjustment coil L5 with the number of windings of the receiving coil L3 made smaller than the number of windings of the feeding coil L2. For example, it is assumed that the inductance of the feeding coil L2 is 128 (μH), and the number of windings thereof is 15 and that the inductance of the receiving coil L3 is 112 (μH), and the number of windings thereof is 14. The AL values of both the feeding and receiving coils L2 and L3 are 0.571 (μH/(N$^2$)). That is, 0.571×15$^2$=128 (μH) and 0.571×14$^2$=112 (μH) are satisfied.

It is assumed that the inductance of the adjustment coil L5 is 4.9 (μH) when the movable core 114 is not inserted, that the inductance thereof is 17 (μH) when only half of the movable core 114 is inserted, and that the inductance thereof is 28 (μH) when the movable core 114 is fully inserted. Thus, when only half of the movable core 114 is inserted into the adjustment coil L5 connected in series to the receiving coil L3, 112+17=129 (μH) is satisfied, thereby making the inductance of the adjustment coil L5 substantially coincide with the inductance of the feeding coil L2.

Figure 15:
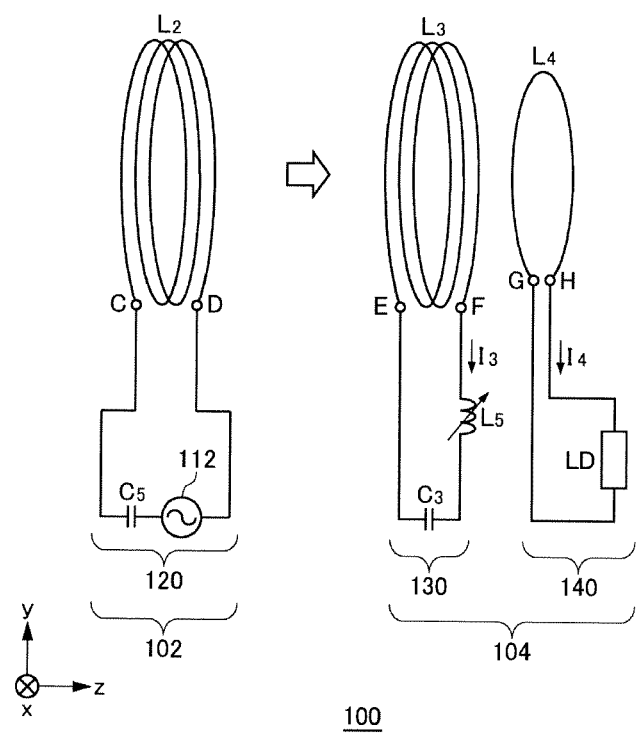
FIG. 15 is a first another example of the system configuration view of the wireless power transmission system.

FIG. 15 is a first another example of the system configuration view of the wireless power transmission system 100. While the AC power supply 112 is used to drive the exciting coil L1 in the configuration illustrated in FIG. 2, the AC power supply 112 may be used to directly drive the feeding coil L2 as illustrated in FIG. 15 by making the feeding coil L2 and capacitor C5 resonate with each other. This configuration can eliminate the need to provide the exciting circuit 110, which is advantageous for size reduction of the wireless power feeder 102. The configuration of FIG. 2 in which the exciting coil L1 is used has an advantage that the Q-value of the power feeding side is more easily increased than in the configuration of FIG. 15.

Figure 16:
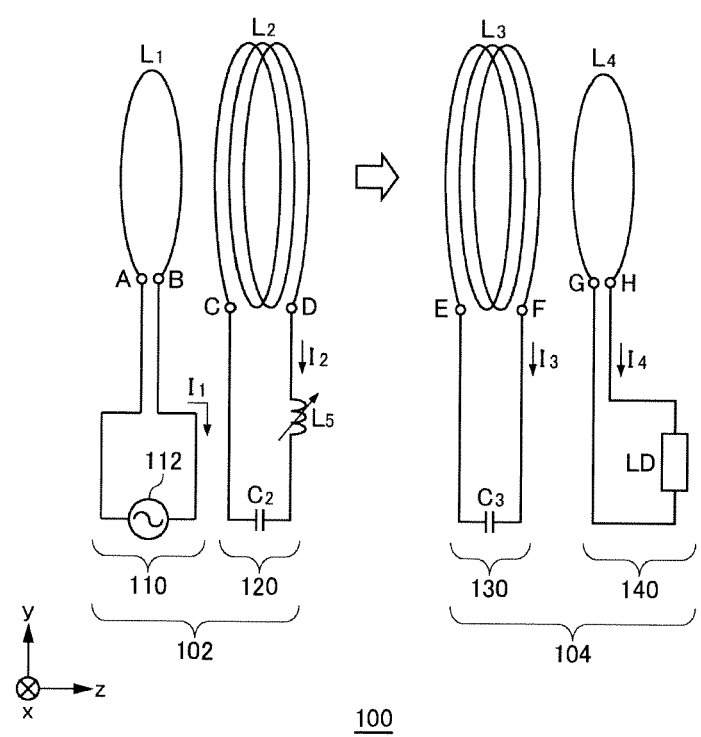
FIG. 16 is a second another example of the system configuration view of the wireless power transmission system.

FIG. 16 is a second another example of the system configuration view of the wireless power transmission system 100. While the adjustment coil L5 is arranged in the receiving coil circuit 130 in the configurations illustrated in FIGS. 2 and 15, the adjustment coil L5 may be arranged on the feeding coil circuit 120 side as illustrated in FIG. 16. In this case, the inductance of the feeding coil circuit 120 can be adjusted by the adjustment coil L5. The inductance of the adjustment coil L5 may be adjusted by the adjustment coil L5 with the number of windings of the feeding coil L2 made smaller than the number of windings of the receiving coil L3. The adjustment coil L5 is arranged such that the axial direction of the adjustment coil L5 and direction of the magnetic flux generated by the receiving coil L3 are at right angles to each other. That is, the adjustment coil L5 is arranged in the transmission package 106 according to any one of the arrangement methods of the types A1 to A3.

The adjustment coil L5 may be provided in both the feeding coil circuit 120 and receiving coil circuit 130. Further, even in a type as illustrated in FIG. 15 in which the exciting circuit 110 is not used, the inductance of the feeding coil circuit 120 can be adjusted when the adjustment coil L5 is arranged in the feeding coil circuit 120.

[Second Embodiment]

Figure 17:
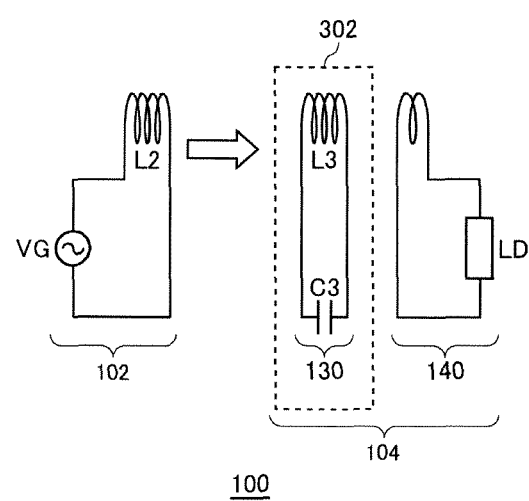
FIG. 17 is a view illustrating operation principle of the wireless power transmission system according to a second embodiment.

FIG. 17 is a view illustrating operation principle of the wireless power transmission system 100 according to a second embodiment. As in the case of the first embodiment, the wireless power transmission system 100 according to the second embodiment includes the wireless power feeder 102 and wireless power receiver 104. However, although the wireless power receiver 104 includes the power receiving LC resonance circuit 302, the wireless power feeder 102 does not include the power feeding LC resonance circuit 300. That is, the feeding coil L2 does not constitute a part of the LC resonance circuit. More specifically, the feeding coil L2 does not form any resonance circuit with other circuit elements included in the wireless power feeder 102. No capacitor is connected in series or in parallel to the feeding coil L2. Thus, the feeding coil L2 does not resonate in a frequency at which power transmission is performed.

The power feeding source VG supplies AC current of the resonance frequency fr1 to the feeding coil L2. The feeding coil L2 does not resonate but generates an AC magnetic field of the resonance frequency fr1. The receiving LC resonance circuit 302 resonates by receiving the AC magnetic field. As a result, large AC current flows in the power receiving LC resonance circuit 302. Studies conducted by the present inventor have revealed that formation of the LC resonance circuit is not essential in the wireless power feeder 102. The feeding coil L2 does not constitute a part of the power feeding LC resonance circuit, so that the wireless power feeder 102 does not resonate at the resonance frequency fr1. It has been generally believed that, in the wireless power feeding of a magnetic field resonance type, making resonance circuits which are formed on both the power feeding side and power receiving side resonate at the same resonance frequency fr1 (=fr0) allows power feeding of large power. However, it is found that even in the case where the wireless power feeder 102 does not contain the power feeding LC resonance circuit 300, if the wireless power receiver 104 includes the power receiving LC resonance circuit 302, the wireless power feeding of a magnetic field resonance type can be achieved.

Even when the feeding coil L2 and receiving coil L3 are magnetic-field-coupled to each other, a new resonance circuit (new resonance circuit formed by coupling of resonance circuits) is not formed due to absence of the capacitor C2. In this case, the stronger the magnetic field coupling between the feeding coil L2 and receiving coil L3, the greater the influence exerted on the resonance frequency of the power receiving LC resonance circuit 302. By supplying AC current of this resonance frequency, that is, a frequency near the resonance frequency fr1 to the feeding coil L2, the wireless power feeding of a magnetic field resonance type can be achieved. In this configuration, the capacitor C2 need not be provided, which is advantageous in terms of size and cost.

Figure 18:
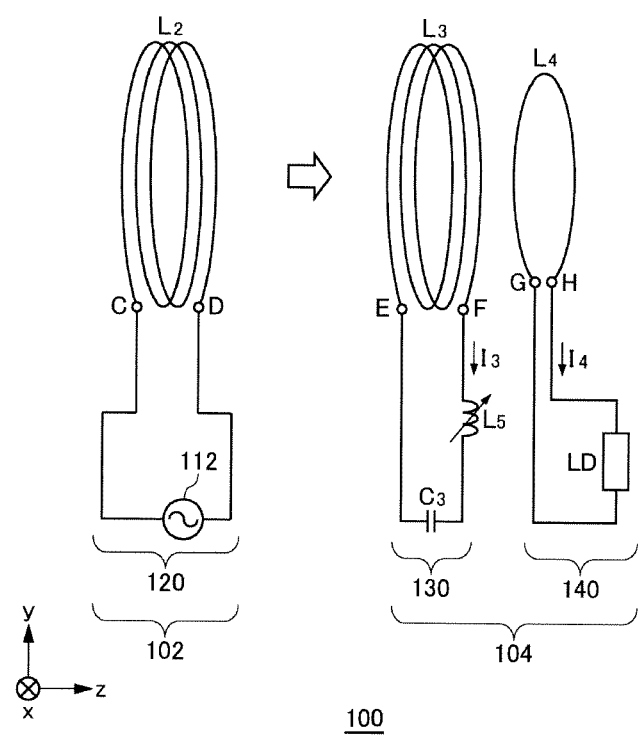
FIG. 18 is a system configuration view of the wireless power transmission system according to the second embodiment.

FIG. 18 is a system configuration view of the wireless power transmission system 100 according to the second embodiment. In the wireless power transmission system 100 of the second embodiment, the capacitor C2 is omitted. Other points are the same as the first embodiment.

The wireless power transmission system 100 has been described based on the preferred embodiments. According to the abovementioned embodiments, the use of the adjustment coil L5 allows the inductance of the feeding coil circuit 120 or receiving coil circuit 130 to be adjusted. Further, the magnetic flux generated by the feeding coil L2 does not cause an electromotive force to occur in the adjustment coil L5, thereby making it possible to facilitate adjustment of the resonance frequency of the feeding coil circuit 120 or receiving coil circuit 130.

The present invention has been described based on the above embodiments. It should be understood by those skilled in the art that the above embodiments are merely exemplary of the invention, various modifications and changes may be made within the scope of the claims of the present invention, and all such variations may be included within the scope of the claims of the present invention. Thus, the descriptions and drawings in this specification should be considered as not restrictive but illustrative.

For example, the adjustment coil L5 may be surrounded by a shield so as to prevent the influence of an external magnetic field on the adjustment coil L5.

The "AC power" used in the wireless power transmission system 100 may be transmitted not only as an energy but also as a signal. Even in the case where an analog signal or digital signal is fed by wireless, the wireless power transmission method of the present invention may be used.

What is claimed is:

1. A wireless power feeder that wirelessly feeds power from a feeding coil to a receiving coil using a magnetic field resonance phenomenon between the feeding coil and the receiving coil, the feeder comprising:
   a feeding coil circuit that includes the feeding coil;
   a power supply circuit that supplies AC power to the feeding coil; and
   a transmission package for accommodating the feeding coil, wherein
   the feeding coil circuit further includes:
      an adjustment coil whose axial direction is substantially perpendicular to a direction of magnetic flux generated by the receiving coil, the adjustment coil being contained in the transmission package,
      a bobbin on which the adjustment coil is wound, the bobbin having a hole extending along the axial direction, an inner surface of the hole having a screw groove, and
      a movable core insert having an outer surface with a screw groove to be engaged with the screw groove of the hole for allowing the movable core insert to move in the hole along the axial direction, wherein
      the movable core insert comprising:
      a cylindrical core case having the outer surface with the screw groove to be engaged with the screw groove of the hole of the bobbin; and
      a column-shaped core, without a screw groove, to be inserted in the cylindrical core case.

2. The wireless power feeder according to claim 1, wherein the axial direction of the adjustment coil is substantially perpendicular o a power feeding direction of the feeding coil.

3. The wireless power feeder according to claim 1, further comprising an exciting circuit including an exciting coil magnetically coupled to the feeding coil, wherein
   the exciting circuit supplies the AC power supplied from the power supply circuit from the exciting coil to the feeding coil.

4. The wireless power feeder according to claim 1, wherein the power supply circuit causes the feeding coil to which no capacitor is connected in series or in parallel, to feed the AC power to the receiving coil.

5. The wireless power feeder according to claim 1, wherein the feeding coil does not form, together with circuit elements on the power feeding side, a resonance circuit having a resonance point corresponding to the resonance frequency of the receiving coil.

6. The wireless power feeder according to claim 1, wherein no capacitor is connected in series or in parallel to the feeding coil.

7. The wireless power feeder according to claim 1, wherein the feeding coil circuit resonates at the resonance frequency of the receiving coil.

8. A wireless power receiver that receives, at a receiving coil, AC power wirelessly fed from a feeding coil using a magnetic field resonance phenomenon between the feeding coil and receiving coil, the receiver comprising:
   a receiving coil circuit that includes a receiving coil and a capacitor;
   a loading circuit that includes a loading coil that is magnetically coupled to the receiving coil to receive the AC power from the receiving coil and supply the AC power to a load; and
   a receiving package for accommodating the receiving coil, wherein
   the receiving coil circuit further includes:
      an adjustment coil whose axial direction is substantially perpendicular o a direction of magnetic flux generated by the feeding coil, the adjustment coil being contained in the receiving package,
      a bobbin on which the adjustment coil is wound, the bobbin having a hole extending along the axial direction, an inner surface of the hole having a screw groove, and
      a movable core insert having an outer surface with a screw groove to be engaged with the screw groove of the hole for allowing the movable core insert to move in the hole along the axial direction, wherein
      the movable core insert comprising:
      a cylindrical core case having the outer surface with the screw groove to be engaged with the screw groove of the hole of the bobbin; and
      a column-shaped core, without a screw groove, to be inserted in the cylindrical core case.

9. The wireless power receiver according to claim 8, wherein the axial direction of the adjustment coil is substantially perpendicular to the power feeding direction of the feeding coil.

10. The wireless power receiver according to claim 8, wherein the receiving coil circuit resonates at the resonance frequency of the feeding coil circuit.

11. A wireless power transmission system for wirelessly feeding power from a feeding coil to a receiving coil using a magnetic field resonance phenomenon between the feeding coil and receiving coil, the system comprising:
    a feeding coil circuit that includes the feeding coil;
    a power supply circuit that supplies AC power to the feeding coil;
    a receiving coil circuit that includes a receiving coil and a capacitor;
    a loading circuit that includes a loading coil that is magnetically coupled to the receiving coil to receive the AC power from the receiving coil and supply the AC power to a load;
    a first coil package for accommodating one of the feeding coil and the receiving coil, wherein
    one of the feeding coil circuit and the receiving coil circuit, having the one of the feeding coil and the receiving coil, includes:
       a first adjustment coil whose axial direction is substantially perpendicular to a power feeding direction of the feeding coil, the first adjustment coil being contained in the first coil package,
       a first bobbin on which the first adjustment coil is wound, the first bobbin having a hole extending along the axial direction, an inner surface of the hole having a screw groove, and
       a first movable core insert having an outer surface with a screw groove to be engaged with the screw groove of the hole for allowing the first movable core insert to move in the hole along the axial direction, wherein
       the first movable core insert comprising:
       a first cylindrical core case having the outer surface with the screw groove to be engaged with the screw groove of the hole of the first bobbin; and
       a first core to be inserted in the first cylindrical core case, the first core having a column shape without a screw groove.

12. The wireless power transmission system according to claim 11, further comprising a second coil package for accommodating the other of the feeding coil and the receiving coil, wherein the other of the feeding coil circuit and the receiving coil circuit includes:
- a second adjustment coil whose axial direction is substantially perpendicular to the power feeding direction of the feeding coil, the second adjustment coil being contained in the second coil package,
- a second bobbin on which the second adjustment coil is wound, the second bobbin having a hole extending along the axial direction, an inner surface of the hole having a screw groove, and
- a second movable core insert having an outer surface with a screw groove to be engaged with the screw groove of the hole for allowing the second movable core insert to move in the hole along the axial direction.

13. The wireless power transmission system according to claim 12, wherein the second movable core insert comprising:
- a second cylindrical core case having the outer surface with the screw groove to be engaged with the screw groove of the hole of the second bobbin; and
- a second core to be inserted in the second cylindrical core case.

* * * * *